US007512900B2

(12) United States Patent
Lynch et al.

(10) Patent No.: US 7,512,900 B2
(45) Date of Patent: Mar. 31, 2009

(54) METHODS AND APPARATUSES TO GENERATE LINKS FROM CONTENT IN AN ACTIVE WINDOW

(75) Inventors: Michael R. Lynch, Melbourn (GB); Richard Gaunt, London (GB)

(73) Assignee: Autonomy Corporation Ltd., Cambridge (GB)

( * ) Notice: Subject to any disclaimer, the term of this patent is extended or adjusted under 35 U.S.C. 154(b) by 516 days.

(21) Appl. No.: 10/901,585

(22) Filed: Jul. 28, 2004

(65) Prior Publication Data
US 2005/0177805 A1  Aug. 11, 2005

(30) Foreign Application Priority Data
Feb. 11, 2004 (GB) ............................... 04029566.7

(51) Int. Cl.
G06F 3/00 (2006.01)
G06F 3/048 (2006.01)
(52) U.S. Cl. .................. 715/825; 715/708; 715/811
(58) Field of Classification Search ......... 715/968, 715/708, 825, 501.1, 765, 810, 811
See application file for complete search history.

(56) References Cited

U.S. PATENT DOCUMENTS

| 5,140,677 | A | * | 8/1992 | Fleming et al. ............. 715/835 |
| 5,418,951 | A | | 5/1995 | Damashek |
| 5,649,192 | A | | 7/1997 | Stucky |
| 5,675,819 | A | | 10/1997 | Schuetze |
| 5,734,916 | A | | 3/1998 | Greenfield et al. |
| 5,799,268 | A | | 8/1998 | Boguraev |
| 5,842,009 | A | | 11/1998 | Borovoy et al. |
| 5,873,107 | A | | 2/1999 | Borovoy et al. |
| 5,974,412 | A | | 10/1999 | Hazlehurst et al. |
| 5,983,216 | A | | 11/1999 | Kirsch et al. |
| 6,006,221 | A | | 12/1999 | Liddy et al. |
| 6,026,409 | A | | 2/2000 | Blumenthal |
| 6,055,569 | A | | 4/2000 | O'Brien et al. |
| 6,078,914 | A | | 6/2000 | Redfern |
| 6,122,647 | A | * | 9/2000 | Horowitz et al. ............ 715/513 |
| 6,137,911 | A | | 10/2000 | Zhilyaev |
| 6,233,571 | B1 | | 5/2001 | Egger et al. |
| 6,243,708 | B1 | | 6/2001 | deVries et al. |
| 6,295,543 | B1 | | 9/2001 | Block et al. |
| 6,327,590 | B1 | | 12/2001 | Chidlovskii et al. |
| 6,336,124 | B1 | | 1/2002 | Alam et al. |
| 6,356,899 | B1 | * | 3/2002 | Chakrabarti et al. .......... 707/5 |
| 6,397,211 | B1 | | 5/2002 | Cooper |

(Continued)

OTHER PUBLICATIONS e-consultancy, New search from Autonomy 'the death of search engins', e-consultancy, Mar. 2000, pp. 1-2.*

(Continued)

Primary Examiner—Dennis Bonshock
(74) Attorney, Agent, or Firm—Rutan & Tucker, LLP

(57) ABSTRACT

Various methods and apparatuses are described to generate a list of one or more links related to the content in an active window without a user having to request the query. The text from content in an active window may be analyzed. A query may be executed on the content in the active window without a user having to request the query. A first icon that represents a category of links related to the content may be embedded in an application operating in the active window. A list of links related to the content in the active window may be generated.

25 Claims, 8 Drawing Sheets

U.S. PATENT DOCUMENTS

| | | | |
|---|---|---|---|
| 6,438,539 B1 | 8/2002 | Korolev et al. | |
| 6,477,524 B1 | 11/2002 | Taskiran et al. | |
| 6,480,837 B1 | 11/2002 | Dutta | |
| 6,480,843 B2 | 11/2002 | Li | |
| 6,493,711 B1 | 12/2002 | Jeffrey | |
| 6,510,434 B1 | 1/2003 | Anderson et al. | |
| 6,513,031 B1 | 1/2003 | Fries et al. | |
| 6,513,036 B2 | 1/2003 | Fruensgaard et al. | |
| 6,516,308 B1 | 2/2003 | Cohen | |
| 6,523,026 B1 | 2/2003 | Gillis | |
| 6,535,896 B2 | 3/2003 | Britton et al. | |
| 6,560,590 B1 | 5/2003 | Shwe et al. | |
| 6,560,600 B1 | 5/2003 | Broder | |
| 6,584,468 B1 | 6/2003 | Gabriel et al. | |
| 6,592,627 B1 | 7/2003 | Agrawal et al. | |
| 6,601,075 B1 | 7/2003 | Huang et al. | |
| 6,611,825 B1 | 8/2003 | Billheimer et al. | |
| 6,618,727 B1 | 9/2003 | Wheeler et al. | |
| 6,631,367 B2 | 10/2003 | Teng et al. | |
| 6,635,088 B1 | 10/2003 | Hind et al. | |
| 6,635,089 B1 | 10/2003 | Burkett et al. | |
| 6,651,219 B1 | 11/2003 | Elliott | |
| 6,654,735 B1 | 11/2003 | Eichstaedt et al. | |
| 6,654,754 B1 | 11/2003 | Knauft et al. | |
| 6,657,350 B2 | 12/2003 | Kimura et al. | |
| 6,658,623 B1 * | 12/2003 | Schilit et al. | 715/513 |
| 6,665,661 B1 | 12/2003 | Crow et al. | |
| 6,668,256 B1 | 12/2003 | Lynch | |
| 6,675,353 B1 | 1/2004 | Friedman | |
| 6,675,354 B1 | 1/2004 | Claussen et al. | |
| 6,718,324 B2 | 4/2004 | Edlund et al. | |
| 6,732,102 B1 | 5/2004 | Khandekar | |
| 6,738,798 B1 | 5/2004 | Ploetz et al. | |
| 6,804,662 B1 | 10/2004 | Annau et al. | |
| 6,848,078 B1 | 1/2005 | Birsan et al. | |
| 6,985,898 B1 | 1/2006 | Ripley et al. | |
| 7,031,961 B2 | 4/2006 | Pitkow et al. | |
| 7,155,489 B1 * | 12/2006 | Heilbron et al. | 709/217 |
| 2001/0020238 A1 | 9/2001 | Tsuda | |
| 2001/0032217 A1 | 10/2001 | Huang | |
| 2001/0037332 A1 | 11/2001 | Miller et al. | |
| 2001/0037345 A1 | 11/2001 | Kiernan et al. | |
| 2001/0051948 A1 | 12/2001 | Srinivasan et al. | |
| 2002/0002483 A1 | 1/2002 | Siegel et al. | |
| 2002/0052898 A1 | 5/2002 | Schilit et al. | |
| 2002/0129014 A1 | 9/2002 | Kim et al. | |
| 2002/0156760 A1 | 10/2002 | Lawrence et al. | |
| 2003/0028512 A1 | 2/2003 | Stensmo | |
| 2003/0079185 A1 | 4/2003 | Katariya et al. | |
| 2003/0084040 A1 | 5/2003 | Jeffrey | |
| 2003/0167266 A1 | 9/2003 | Saldanha et al. | |

OTHER PUBLICATIONS

Primus White Paper, "Providing a Superior User Experience with Web Self-Service," Sep. 2001, 29 pgs.

Leyden, John, "Free tool threatens search engines," http://www.vnunet.com/News/601494, Mar. 3, 2000, 2 pgs.

Kanellos, Michael, "Microsoft aims for search on its own terms," CNET news.com, http://news.com.com/2100-1008-5110910.html?tag=sas_email, Nov. 24, 2003, 8 pgs.

Kenjin product datasheet, by Autonomy, Jan. 2001, 2 pgs.

Wilby, Dave, "Kenjin," Internet Magazine, Jun. 2000, 2 pgs.

Anhai Doan et al., Reconciling Schemas of Disparate Data Sources: A Machine-Learning Approach, ACM SIGMOD Record, Proceedings of the 2001 AC, SIGMOD International Conference on Management of Data SIGMOD '01, vol. 30 Issue 2, May 21-24, 2001.

Autonomy, About Autonomy, Aug. 2001, pp. 1-2 http://www.autonomy.com/autonomy_v3Widgets/Prints/Print.pxml.

Autonomy—Adding Intelligence to the XML, Nov. 2000, pp. 1-3. http://www.autonomy.com/autonomy/dynamic/autopage466.shtml.

Autonomy, Adding Intelligence to XML, Aug. 2001, pp. 1-3 http://www.autonomy.com/autonomy_v3Widgets/Prints/Print.pxml.

"Autonomy Delivers Agentware i3™ Product Line," Palo Alto, CA., Aug. 5, 1997.

"Autonomy Enables Butterworths," Feb. 8, 1999.

"Autonomy First to Fully Automate XML Tagging," Jun. 2, 1998.

Autonomy, First to Fully Automate XML Tagging, Jun. 1998, pp. 1-2. http://www.autonomy.com/autonomy/dynamic/autopage150.shtml.

"Autonomy Helps Vignette Customers Quickly Reap the Benefits of Internet Relationship Management," Jan. 4, 1999.

Autonomy, Intellectual Foundations, Aug. 2001, pp. 1-2 http://www.autonomy.com/autonomy_v3Widgets/Prints/Print.pxml.

Autonomy, Kenjin, Bring autonomy's technology to your PC, Mar. 2001 http://www.autonomy.com/autonomy/dynamic/autopage203.shtml.

"Autonomy Launches Portal-In-A-Box™ Eliminates Need For Costly Manual Labor In Creating And Maintaining Portal Sites," Feb. 1, 1999.

Autonomy, Limitations of Other Approaches, Aug. 2001, pp. 1-2 http://www.autonomy.com/autonomy_v3Widgets/Prints/Print.pxml.

Autonomy, Solutions Landing Page, Feb. 2001, pp. 1-2 http://www.autonomy.com.autonomy/dynamic/autopage442.shtml.

Autonomy, Technology, Aug. 2001, pp. 1-2 http://www.autonomy.com/autonomy_v3Widgets/Prints/Print.pxml.

Autonomy, Technology Benefits, Aug. 2001, p. 1 http://www.autonomy.com/autonomy_v3Widgets/Prints/Print.pxml.

"Autonomy Technology Helps Leading Network Services Company to Create Online 'Brain Trusts'," Aug. 24, 1999.

Autonomy, Technology White Paper, Sep. 1997, pp. 1-17. www.autonomy.com.

Autonomy, Technology White Paper, Aug. 2001, pp. 1-19.

"Autonomy Unveils New Platform For Applications Using Unstructured Data," Jan. 25, 2000.

Autonomy, XML White Paper, Aug. 2001, pp. 1-12.

"Caredata.com Licences Autonomy Technology for Citeline Web Research Tools," Dec. 14, 1999.

Crouch.C., et al., "Experiments in Automatic Statistical Thesaurus Construction", Jun. 1992 pp. 77-88.

Fortier, Paul, "SQL-3 Implementing the Object-Relational Database," 1999, McGraw-Hill, pp. 17-37.

Haykin, S., Adaptive Filter Theory, Englewood Cliffs, N.J.: Prentice-Hall, 1986, Chapters 5 and 8.

Ivankhnenko, A., "Heuristic Self-Organization in Problems of Engineering Cybernetics Automatica," vol. 6, Mar. 1970, pp. 207-219.

Klema, V., et al., "The Singular Valve Decomposition: Its Computation and Some Applications," IEEE Trans. AC, vol. AC-25, No. 2, Apr. 1980, pp. 164-176.

M.R. Lynch, P.J. Rayner and S.B. Holden, ICASSP 91 vol. 3 D, Digital Signal Processing, Removal of Degeneracy in Adaptive Volterra Networks by Dynamic Structuring, May 14-17, 1991, pp. 2069-2072.

P.J. Rayner and M.R. Lynch, ICASSP 90 vol. 2 $S_2$ VA, Speech Processing 2 VLSI Audio and Electroacoustics, Complexity Reduction in Volterra Connectionist Modelling by Consideration of Output Mapping, Apr. 3-6, 1990, pp. 885-888.

Powell, M.J.D., Radial Basis Function Approximations to Polynomials, Proc. Department of Applied Mathematics and Theoretical Physics, Numerical Analysis, 1987.

Rayner, P. et al.., "A New Connectionist Model Based on a Non-Linear Adaptive Filer Process," ICASSP89, Apr. 1989.

Schetzen, Martin, The Volterra and Weiner Theories of Non-Linear Systems, New York, New York: John Wiley, 1980, Chapter 5.

WebMethods B2B v3.0, "Whitepaper," Oct. 1999, pp. 1-17.

Xue, Q., et al., "Analysis of the Hidden Units of the Multi-Layer Preceptron and its Application in Acoustic-to-Articulatory Mapping," Proc. ICASSP90, Apr. 1990.

"Yahoo! Search," Available from <http://web.archive.org/web/19961128070718/www8.yahoo.com/search.html>, Nov. 28, 1996.

Great Britain Patents Act 1977: Search Report under Section 17, Application No. GB0402956.7, Date of Search Jun. 4, 2004, Examiner Jake Collins, pp. 2 total.

UK Intellectual Property Office, Appeals Decision Whether patent application No. GB0402956.7 complies with section 1(2) dated Nov. 7, 2007, 5 pages.

UK Intellectual Property Office, Draft Judgment from the High Court of Justice Chancery Division Patents Court, Patent application No. GB0402956.7, dated Feb. 6, 2008, 24 pages.

UK Intellectual Property Office, Abbreviated Examination Report, Patent application No. GB0402956.7, dated Oct. 24, 2006, 2 pages.

UK Intellectual Property Office, Examination Report, Patent application No. GB0402956.7, dated Mar. 6, 2007, 3 pages.

Taylor, Richard, "Patently Obvious? Getting Protective Over Software", Portfolio Media, Inc., http://ip.law360.com/Secure/printview.aspx?id=58479, Jun. 5, 2008, 2 pages.

* cited by examiner

METHODS AND APPARATUSES TO GENERATE LINKS FROM CONTENT IN AN ACTIVE WINDOW

BENEFIT OF FOREIGN APPLICATIONS

This application claims the benefit of Foreign Application Number 0402956.7 filed in the United Kingdom on Feb. 11, 2004.

FIELD OF THE INVENTION

This invention generally relates to Information technology. More particularly this invention relates to linking to contextually similar information from content in an active window.

BACKGROUND OF THE INVENTION

In some search technologies, when a user types a word, such as "Alamo," into a query for a search engine or a relational database, then the engine may return a list of potentially irrelevant information as "relevant results" to the user's query. For example, the search engine may generate links to 1) a car rental company, 2) a town in Texas, or 3) a historical event based upon the word "Alamo." The user is typically only interested in finding relevant links to only one of those categories of information. Relational databases exist where a user can specify a reference document and find relevant related documents to that reference document. A few relational databases exist where a particular field may be pre-designated by the author of the reference document to assist in narrowing a user's query to find relevant related material regarding the reference document. The pre-designated field typically summarizes the main ideas conveyed by the reference document as determined by the author of the reference document. The user of the relational database may choose to use this pre-designated field as the content of the query. However, these relational databases typically return a list of related documents based upon some form of exact word matching.

Some search technologies, allow a program to choose the query terms rather than a user providing these term. These text analyzing tools may be limited to analyzing meta tags associated with a document containing text. If the document is unstructured and has no meta tags then the text analyzing tool can not analyze the actual text in that document. Some other text analyzing tools may rely on the user to supply the key words or concept prior to executing a query to find relevant content. However, these search technologies may also return a list of potentially irrelevant information as "relevant results" to the user's query. The prior art technologies may generally lack the ability to allow the user to more narrowly target the desired related documents that the user wants to find.

Some search programs that are intended to supplement an active application in the desktop window with additional useful information actually interfere with the use of that active application. These behind the scenes search programs should provide links to additional related material to the content in the active window. However, some search programs may have interfered with a user's use of that active application by being obtrusive, which defeated the intent of working behind the scenes to augment the user's experience of using the actual application active in the desktop window.

The displayed search results may have been obtrusively displayed over a portion of the active application in a manner that interfered with the user's viewing of the text and other features of the application in the active window. Also, the displayed search results may have been merely tangentially relevant. Thus, user's time may have been wasted by being distracted from the project in the active window by being visually alerted to view merely tangentially relevant links. Both the filtering through of irrelevant links and the automatic obtrusive display of these links over a portion of the active application that the user may be trying to use may cause user frustration.

SUMMARY OF THE INVENTION

Various methods and apparatuses are described to generate a list of one or more links related to the content in an active window without a user having to request the query. The text from content in an active window may be analyzed. A query may be executed on the content in the active window without a user having to request the query. A first icon that represents a category of links related to the content may be embedded in an application operating in the active window. A list of links related to the content in the active window may be generated.

BRIEF DESCRIPTION OF THE DRAWINGS

The drawings refer to the invention in which.

Figure 1:
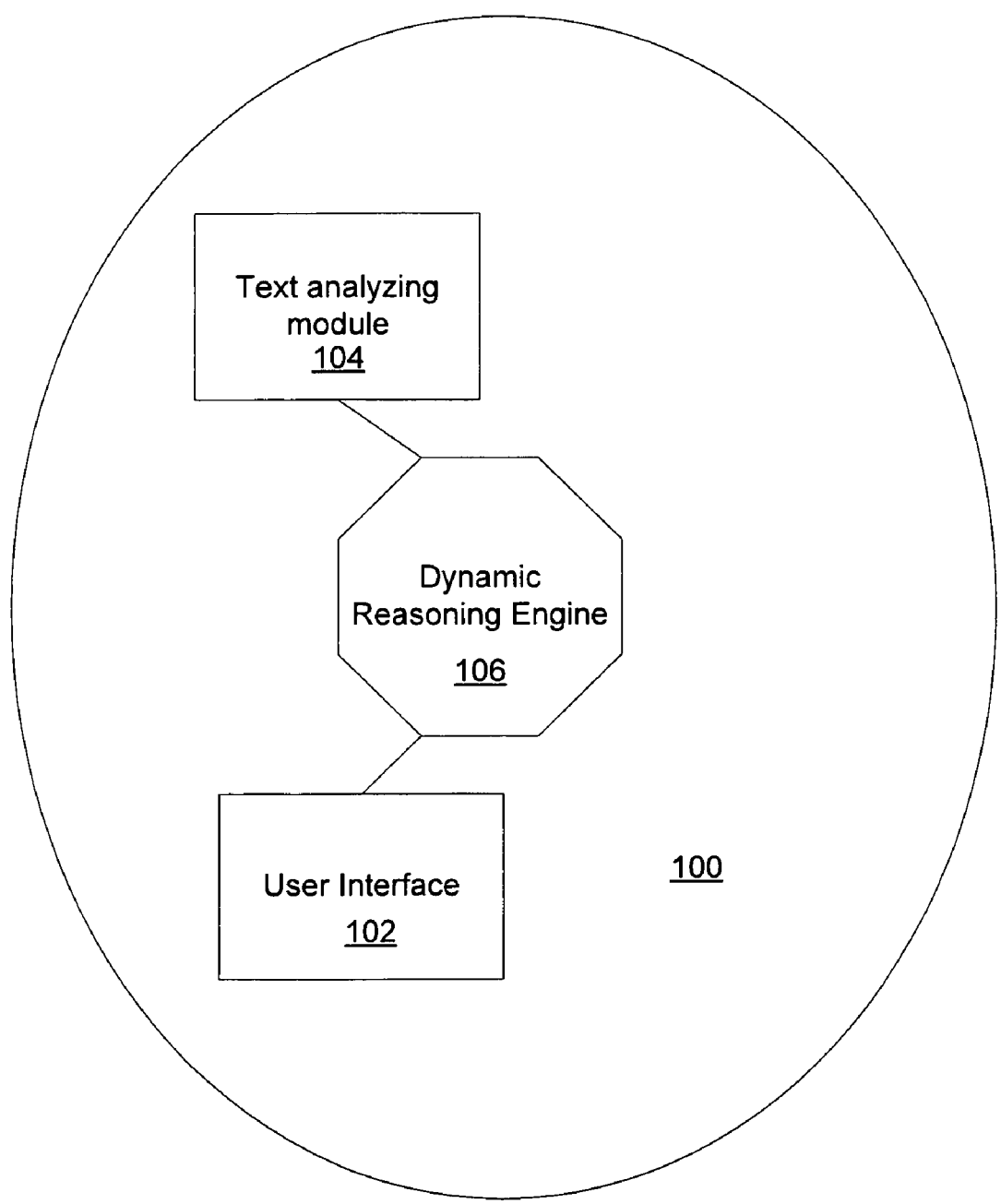
FIG. 1 illustrates a block diagram of an embodiment of a search program to generate a list of one or more links related to the content in an active window.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In general, various methods and apparatuses are described to generate a list of one or more links related to the content in an active window without a user having to request the query. The text from content in an active window may be analyzed. A query may be executed on the content in the active window without a user having to request the query. One or more icons that each represents a category of links related to the content may be embedded in an application operating in the active window. A list of links related to the content in the active window may be generated. One or more of the icons embedded in the application in the active window may be highlighted when 1) one or more of the links relate to the category associated with that icon and 2) the link(s) exceeds a minimum pre-established threshold relevance rating to the content in the active window. The list of links related to the content may be displayed on screen when a user activates the icon.

FIG. 1 illustrates a block diagram of an embodiment of a search program to generate a list of one or more links related to the content in an active window. The search program 100 may have a User Interface 102, a text analyzing module 104, a dynamic reasoning engine 106, as well as other modules.

Figure 2:
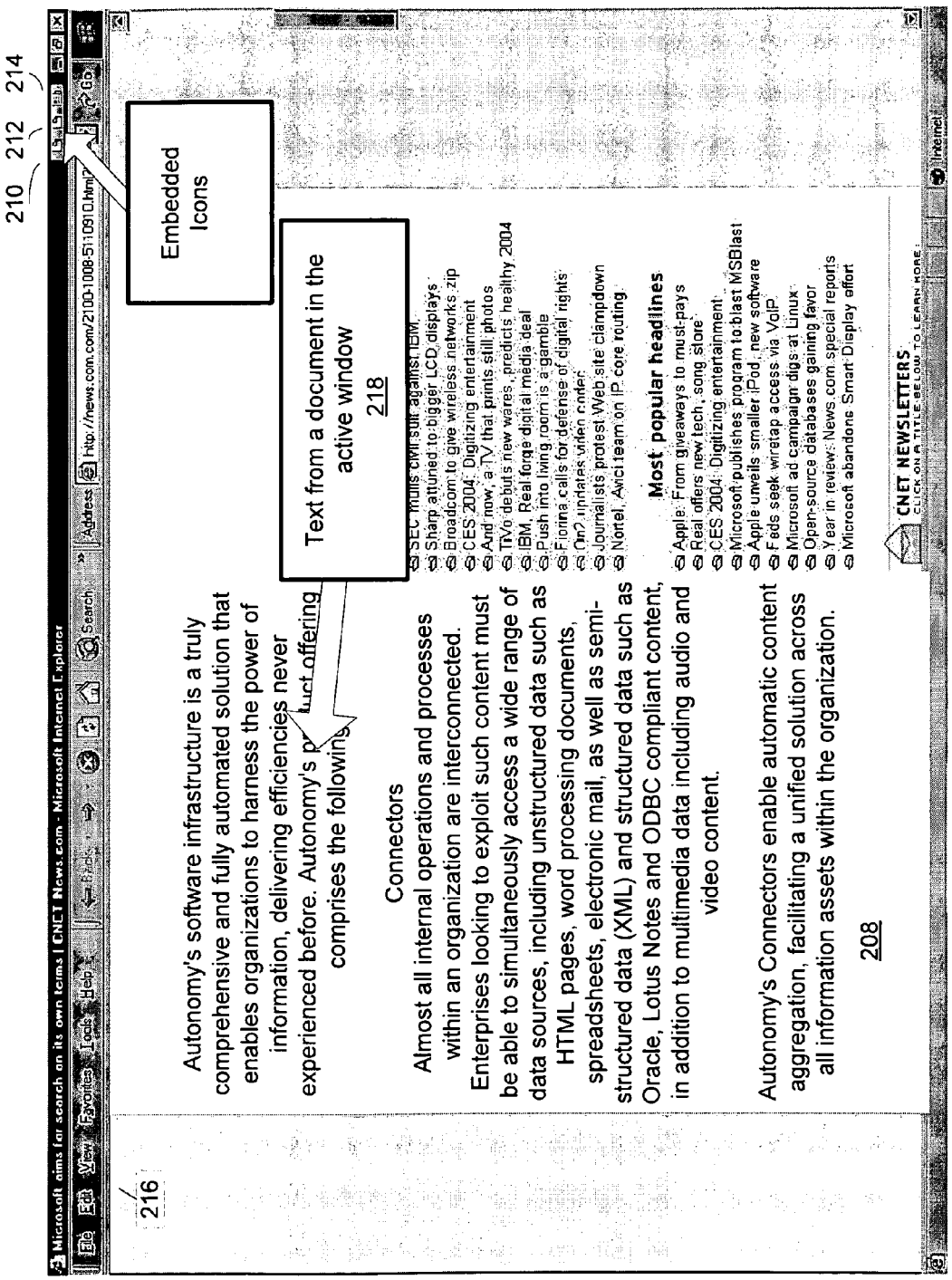
FIG. 2 illustrates a diagram of an example active window that has one or more icons embedded into the application operating in the active window by an embodiment of a search program to generate a list of one or more links related to the content in the active window.

FIG. 2 illustrates a diagram of an example active window that has one or more icons embedded into the application operating in the active window by an embodiment of a search program to generate a list of one or more links related to the content in the active window. Referring to FIGS. 1 and 2, an application, such as an Internet Browser, may be operating in an active window 208 displayed by a windowing operating system. The User Interface 102 embeds one or more icons 210-214 in an unobtrusive display area of an application operating in the active window 208, such as in the title bar 216 of that application.

Note, active window is a common term of art that means any window being displayed and that is selected to be receptive to inputs from a user. The active window may be being displayed on a Laptop, a Desktop, a hand held device, etc. Typically, when multiple windows are being displayed on a monitor, merely one of those windows will be the active window ready to receive input commands and signals from the user.

Each icon 210-214 may represent a different category of links related to the content in the active window 208. For example, a first icon 210 may represent related content on the local hard drive; a second icon 212 may represent available products related to the content in the active window 208, a third icon 214 may represent news articles related to the content in the active window 208 that are stored on a remote database, such as a server on the Internet; a fourth icon (not shown) may represent and other types of reference documents such as Web white papers etc, related to the content in the active window 208 that are stored on a remote server. Note, the search program 100 may search for all types and forms of structured and unstructured documents that relate to the content in the active window. Thus, the categories of icons may include icon types that are tangentially related to the content in the active window and search non-traditional databases such as user's preference databases as well as the traditional informational databases and unstructured document sources that store content that relates to the content in the active window. For example, a fifth icon (not shown) may represent other users of the product with their interests or expertise related to the active window's contents. A sixth icon (not shown) may represent another category of links grouped by how that type of information relates to the content in the active window 208, etc. The User Interface 102 embeds with the active application to display the icons 210-214 representing these categories of links related to the content. Thus, the User Interface 102 embeds with the active application in an unobtrusive manner to allow a user to access to these related links without interfering with the actual application in the active window 208 that the user is trying to use.

The text analyzing module 104 may automatically analyze the actual text 218 from the content in the window when the text 218 is being displayed in the active window 208.

For example, if the application operating in an active window 208 is an Internet browser, then the content may be a commentary on a web page. The actual text 208 of the commentary may be discussing Connectors to automate content aggregation.

The text analyzing module 104 may use the embedded windowing Operating System code to extract the text 218 from the current active window 208.

The dynamic reasoning engine 106 may execute a query on the key terms of the content in the active window 208 without a user having to request the query. The text analyzing module 104 may supply these key terms to the dynamic reasoning engine 106. The dynamic reasoning engine 106 may also generate a list of links related to the content in the active window 208.

The User Interface 102 may highlight an icon, such as the first icon 210, embedded in the application in the active window 208 when 1) one or more of the links that fall into the category associated with that icon and 2) the link(s) exceeds a minimum pre-established threshold relevance rating to the content in the active window 208. The User Interface 102 may display the list of links related to the content on screen when a user activates the highlighted icon. The User Interface 102 may also display a summary of information about a particular link in the list when a user moves a cursor over that link.

The User Interface 102 may use the embedded windowing Operating System code to display icons and to display the link results within any active window itself. The User Interface 102 may embed the icons 210-214 in an unobtrusive way using small icons near the Maximize/Minimize buttons so as not to take up any display screen real estate or unnecessarily distract the user.

Figure 3A:
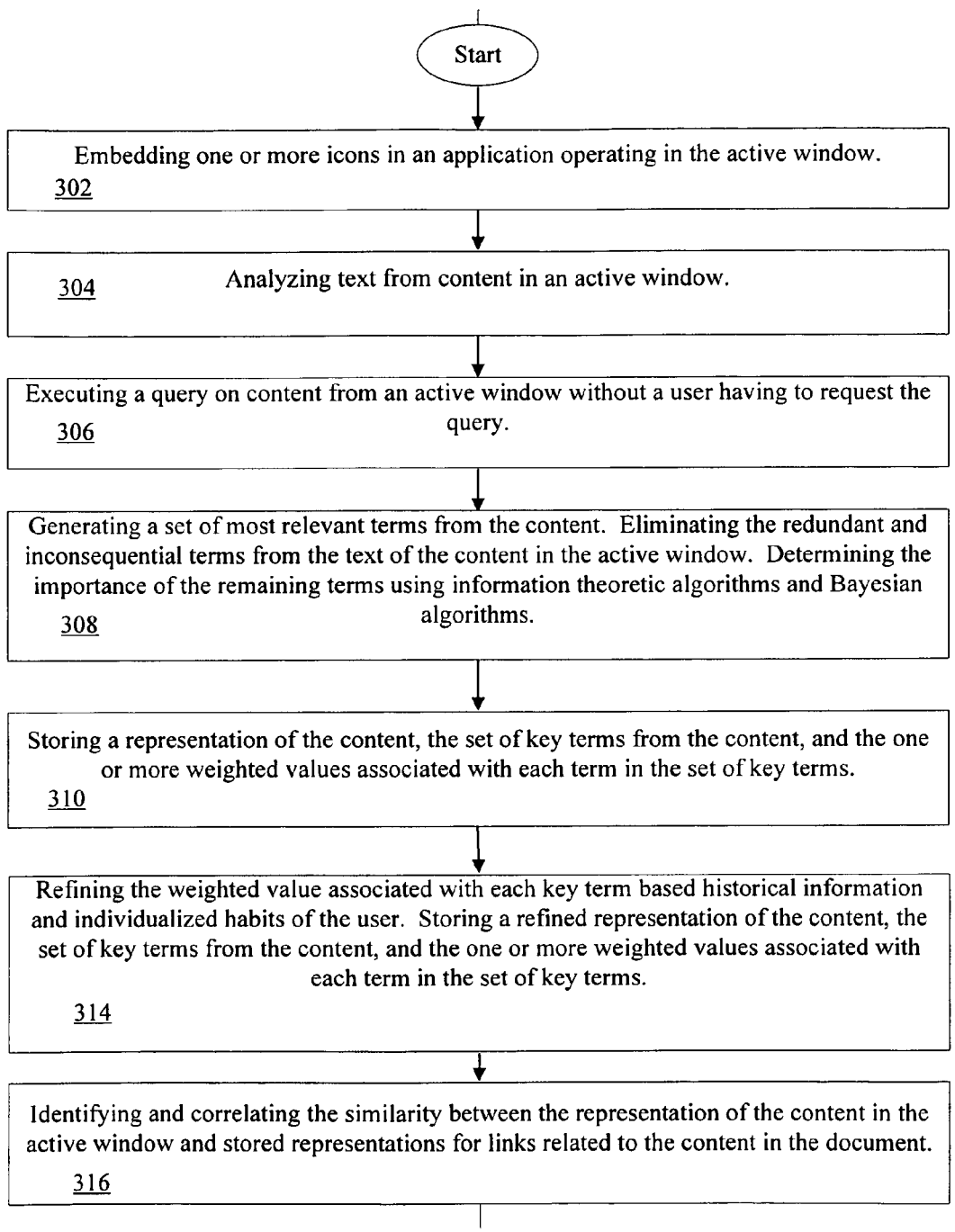
FIG. 3a and FIG. 3b illustrate an embodiment of flow diagram of a process to generate a list of one or more links related to the content in an active window in an unobtrusive manner.
Figure 3B:
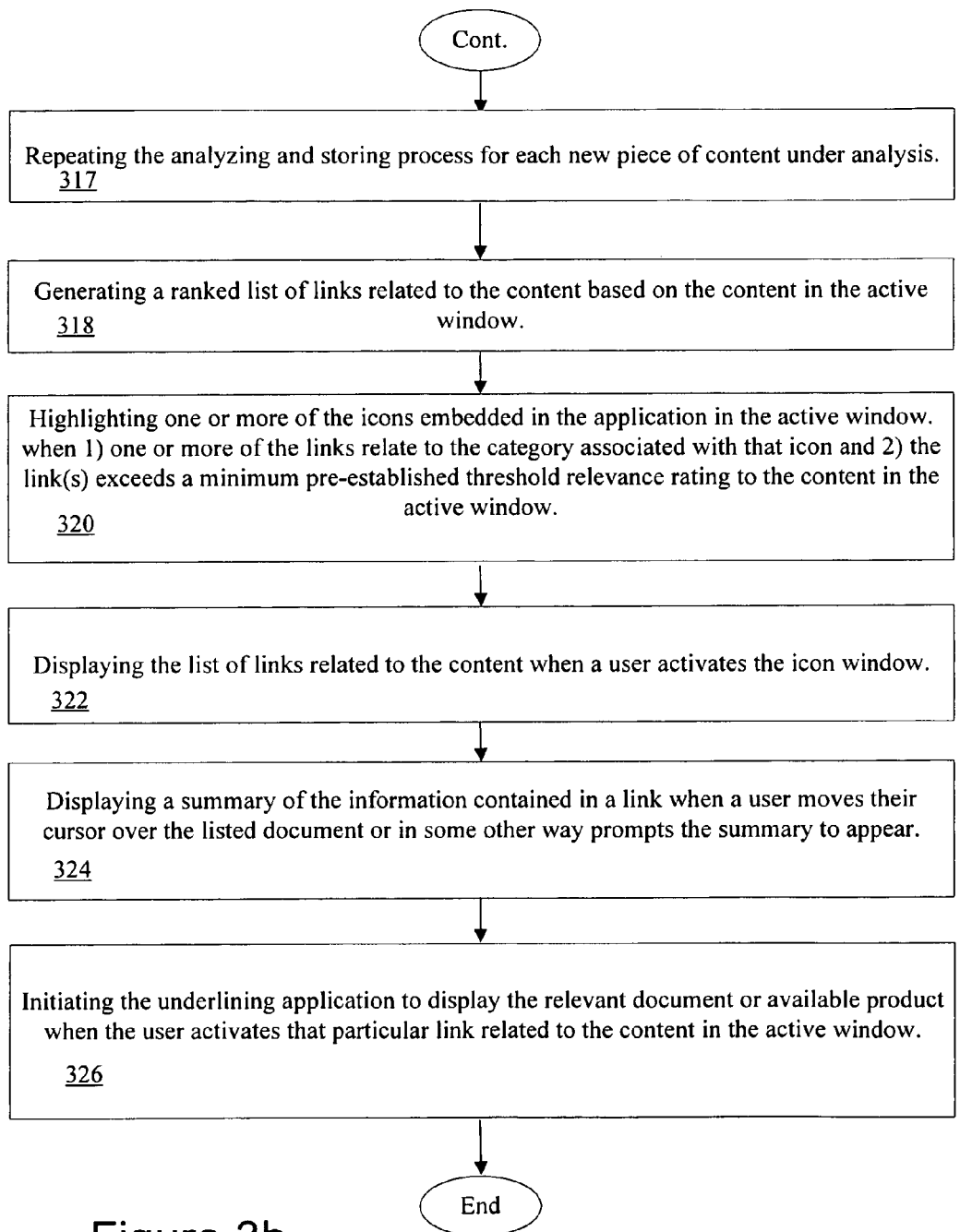

FIG. 3a and FIG. 3b illustrate an embodiment of a flow diagram of a process to generate a list of one or more links related to the content in an active window in an unobtrusive manner.

In block 302, the search program embeds one or more icons in the title bar of an application operating in the active window. Each icon may represent a different category of links related to the content in the active window.

In block 304, the search program analyzes text from content in an active window. The search program analyzes the actual text from the content in the active window by intercepting the text as the text is being displayed. This includes analyzing merely the actual text when the text is being displayed in the active window as well as analyzing the entirety of the text contained within the document when the window containing the document is made the active window. The search program may also analyze any meta tags associated with the document displayed in the active window.

In block 306, the search program may execute a query on content from an active window without a user having to request the query. The query may be executed on the set of the most relevant terms from the content. The search may be executed on information such as documents, stored links, product description, etc. stored locally on the user's hard drive as well as information stored on one or more servers in a remote network. The query may be sent to both a local Dynamic Reasoning Engine (DRE) monitoring content on the local hard drive and a remote DRE connected over a network that monitors various sources of information including the Internet.

In block 308, the search program may have an engine that generates the set of most relevant terms from the content in the following example manner. The search program may have an engine, such as a DRE, that uses stop lists, grammar modeling techniques, and other similar techniques to eliminate inconsequential information from the supplied content. The engine eliminates the trivial information in a sentence to leave the main terms of the sentence. In an embodiment, the engine streamlines all of the content in this manner.

The search program may have an engine that eliminates redundant terms in a corpus of terms contained within the content. In an embodiment, the engine uses an algorithm based on Shannon's information theory to eliminate the redundant terms.

The search program may have an engine that associates one or more weighted values with each term in the set of key terms. After the elimination of the redundant and inconsequential terms from the text of the content in the active window, the engine may start the task of determining the importance of the remaining terms. The engine uses information theoretic algorithms and Bayesian algorithms to determine statistics for each term within the supplied content. In an embodiment, the set of terms may include single terms, higher order terms, noun phrases, proper names, and/or other similar types of information. In an embodiment, the engine may produce multiple statistics associated with each key term. The statistics include position information, those derived from the frequency of occurrence and other statistical information associated with the key terms, at both the document and corpus level. The engine also uses Bayesian algorithms to derive an importance for each term and have their weighted values modified by statistical correlation.

For example, the term "car" is a common term and would be assigned a high frequency derived value. The term "turnip" is very rarely used term and would be assigned a low frequency derived value. The next higher order of this combination of terms, "turnip car," is extremely rare and would be assigned a very low frequency derived value. In comparison, the term "sport" is a common term and would be assigned a high frequency derived value. The next higher order combination of the terms, "sport car," is common and would also be assigned a high frequency derived value.

The engine may also use characteristics of the text intercepted from the display to affect the weight assigned to that text. For example, if the text comes from a heading or the font is bolded then that term is given a higher weight.

In block 310, the search program may have an engine that stores a representation of the content, the set of key terms from the content, and the one or more weighted values associated with each term in the set of key terms. The engine uses this information to create an overall representation, or sometimes referred to as a concept, of the content associated with the document in the active window. The engine combines its knowledge of the content, the information conveyed by any XML type schema associated with the content, and similar representations stored in the representation database to refine the representation of the content in the active window.

In block 314, the engine may refine the weighted value associated with each key term in the first instance. The engine may compare the key terms from a first instance of the representation to key terms within historical representations. The engine may refine the weighted value associated with each key term in the first instance based upon the comparison. In an embodiment, the engine may track a user's personal habits and interest such as Web surfing habits, appointments in the calendar, and other similar collectable information in a user representation. The engine may refine the weighted value associated with each key term in the first instance based upon a comparison with the user representation. The engine finally calculates an Adaptive Concept Modeling Weight from the multiple statistics and other factors associated with each term.

In block 314, the engine also stores the refined representation. The engine may store the refined representation in a separate database of representations.

In block 316, the engine identifies and correlates the similarity between the representation of the content in the active window and representations for links related to the content in the document. The correlation includes semantically similar sets of terms contained in both of the representations. The representations for the links may be stored both locally on the user's machine and on a remote server. Semantically similar set of terms convey roughly the same idea contain but literally different terms. In an embodiment, the engine inserts an internal XML tag-value pair to representations while allowing the representation to keep its original tag-value pair. The engine inserts the internal tag-value pair based upon the nearest category in value to the first value associated with the representation. This assists in creating a common internal XML tag-value pair regarding a particular topic regardless of the actual tag-value pair assigned to the content or the exact words used to convey the concepts in the content. The engine may insert links and pointers into the representation to known similar topics and information. The engine may insert a link to a stored model of the content in the XML field description of a representation. The engine may update the links based on entry of new representations of related tag-value pairings being stored by through that engine. The engine ultimately matches semantically similar representations with each other.

In block 317, the engine repeats the analyzing and storing process for each new piece of content under analysis.

In block 318, the search program generates a ranked list of links related to the content based on the content in the active window. The list may be ranked by a relevance rating calculated by the engine on how semantically similar the representation of the content in the active window is to the other representations stored by the local engine and representations stored by remote databases. The generated links provide links to information, such as documents, products, stored URLs, etc., stored locally on the user's hard drive as well as information stored on one or more servers in a remote network. For example, the links generated associated with a first icon may take a user to structured documents such as database records as well unstructured documents such as e-mails, white papers, Word documents, etc. related to the content the active window and stored on the local hard drive.

Each category of links may have its own rank list of link related to the content in the active window. For example, the links associated with a second icon may take a user to a different type of information such as available products, such as books, videos, etc. related to the content the active window and stored on one or more servers in the Internet. Similarly, the links associated with a third icon may take a user to a different type of relationship to that information such as other users of a product displayed in the active window and the other user's interest and or expertise with that product. For example, a list of vendors of that product and/or a list of service providers for that product.

In block 320, the search program may highlight one or more of the icons embedded in the application in the active window. The search program may highlight an icon when 1) one or more of the links relate to the category associated with that icon and 2) the link(s) exceeds a minimum pre-established threshold relevance rating to the content in the active window. The user interface of the search program generally only attracts the user attention to the relevant links if the found relevant link exceeds a minimum relevance rating. Thus, the related documents or products should have a relevance rating that above a threshold relevance level in relation to the content before alerting the user by highlighting the corresponding icon.

In block 322, the search program may display the list of links related to the content when a user activates the icon window. After the user clicks on in some other way activates the highlighted icon, then the search program displays the ranked list of links related to the content that exceed the minimum pre-establish threshold relevance rating. The user interface of the search program may allow the user or a programmer to establish the value for the minimum pre-establish threshold relevance rating. The ranked list of relevant links may be displayed on screen within the active application that the analyzed text came from. The search program does not force the user to go to a web page hosted by remote server or evoke some other application to see the displayed ranked list of relevant links.

In block 324, the search program may display a summary of the information contained in a link when a user moves their cursor over the listed document or in some other way prompts the summary to appear. For example, when a user hovers their cursor over a particular link to a document, then a summary of the information contained in that document appears on screen in the active window. Similarly, when a user hovers their cursor over a particular link to a product, then a summary of the price, title, and other product information appears on screen in the active window.

In block 326, if the user activates a particular link related to the content, then search program attempts to initiate the underlining application to display the relevant document or available product.

Figure 4:
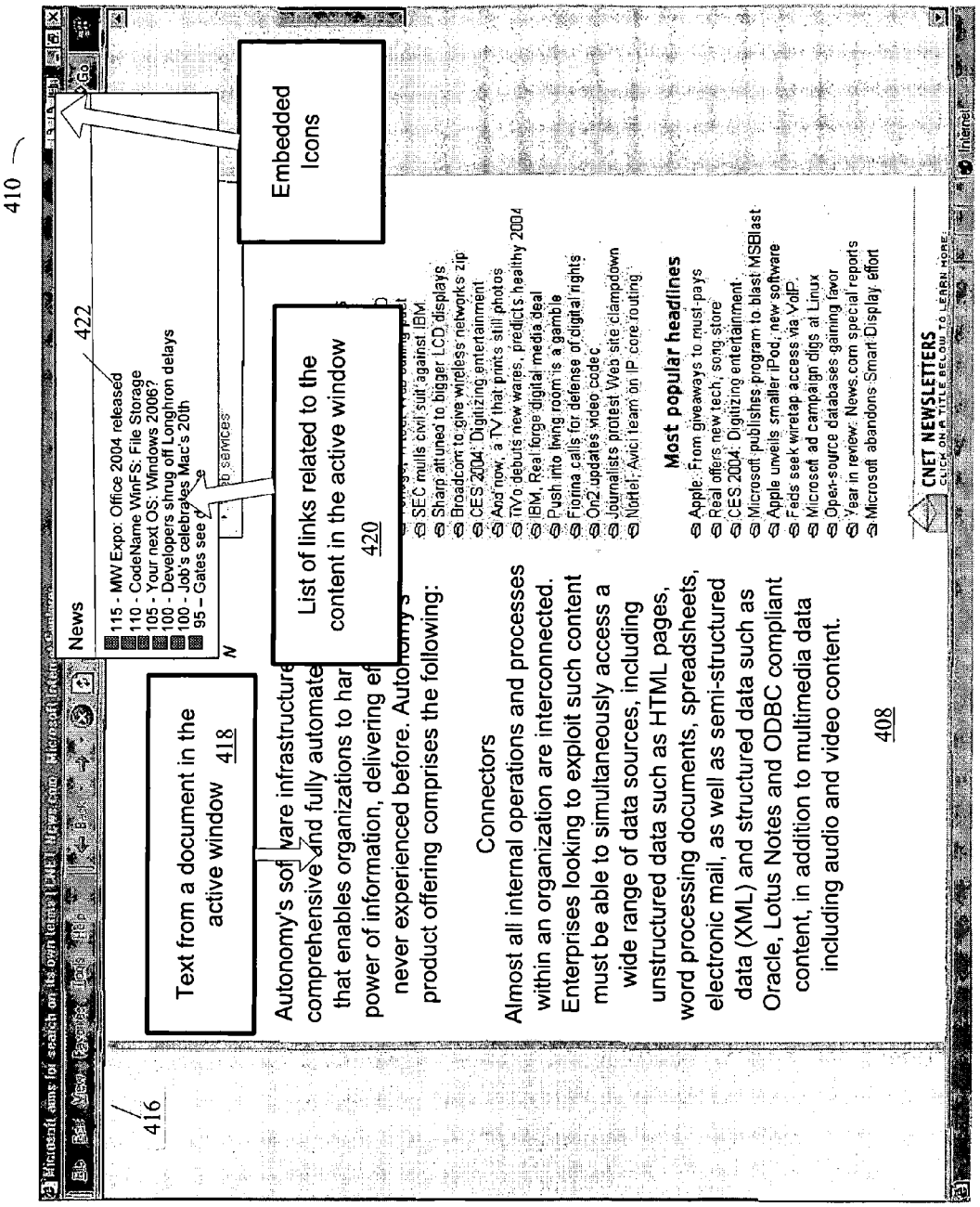
FIG. 4 illustrates a diagram of an example active window that has an icon activated by a user to display a list of one or more links related to the content in the active window.

FIG. 4 illustrates a diagram of an example active window that has an icon activated by a user to display a list of one or more links related to the content in the active window. A first icon 410 embedded by the User Interface in the in the title bar 416 of the application operating in the active window 408 may be associated with the related News article links to the text 418 of the content. The User Interface may display a list of, for example, six links of news articles 420 related to the content in the active window 408 when the user activates the first icon 410. The links 420 may be ranked in order of relevance rating to the analyzed text 418 of the content in the active window 420. Each link may also display the relevance rating assigned to that link by the engine. For example, a first hypertext link 422 supplies a link to News article on MW Expo Office 2004release. The first hypertext link 422 has a relevance rating of 115. The list of links 420 may be displayed within the active window 408. The news articles may be in a structured or unstructured format.

In general, structured information may include information formatted with structure elements of a data record designed to assist in processing that information by some form of rule-based system that expects specific sets of input values and specific types of fields. Structured information generally lacks contextual text or audio speech information, and consists of fielded/tagged information that adheres to a predefined schema or taxonomy. A typical example of structured information is a transaction record for a bank. The transaction record contains fields that have precisely defined allowable values, such as 'name', 'account number', 'amount', 'date', etc., but lacks free-form contextual fields. The structure of that document is known and the type of information to be found in those fields is also known.

In general, unstructured information lacks definable/reliable in/out fields that assist in processing that information, by some form of rule-based system that expects specific sets of input values and specific types of fields. Unstructured information may contain a piece of textual or audio speech information that lacks any defined structured meta tags relating to the conceptual content of the information. The actual words in the commentary by themselves could be considered unstructured information.

Figure 5:
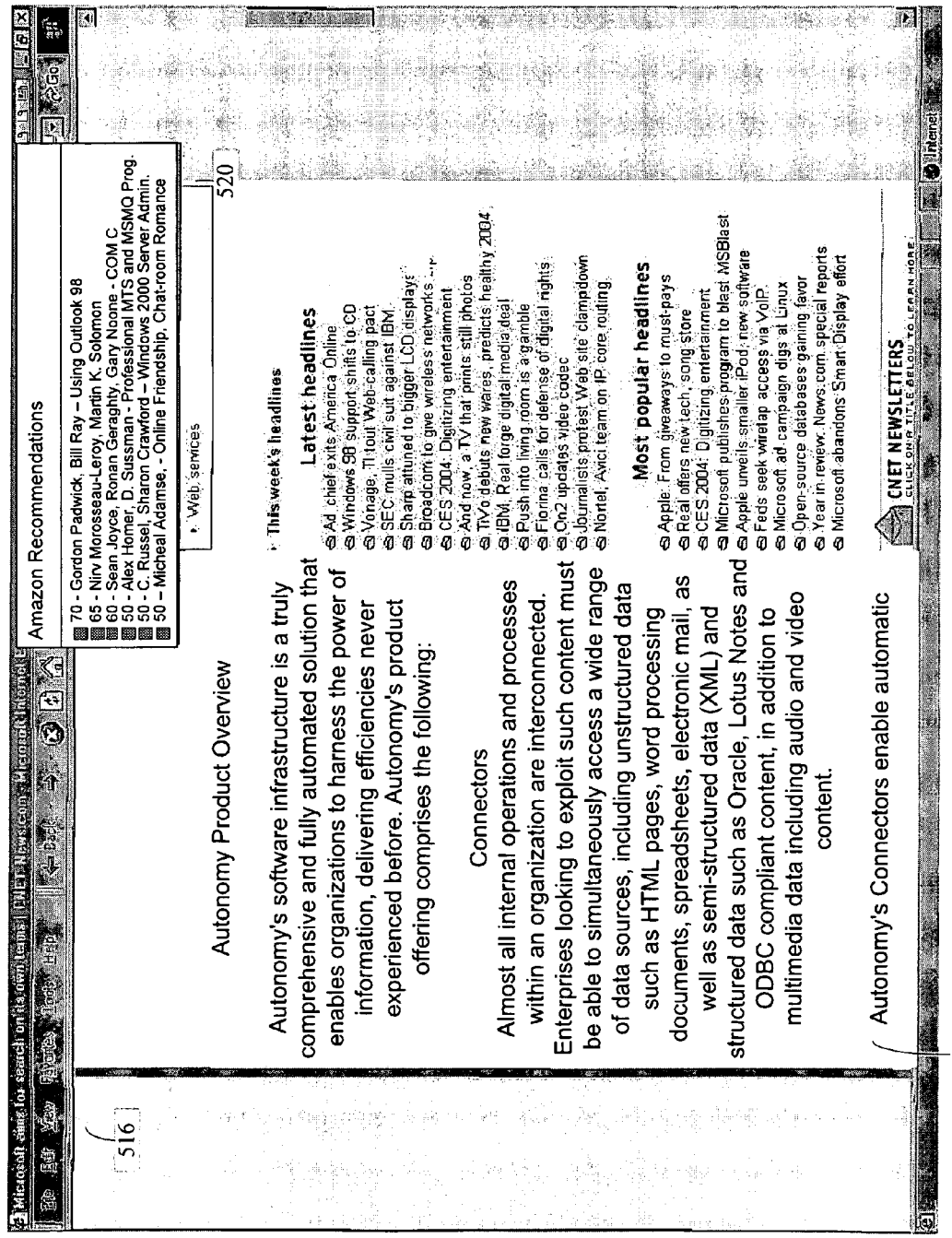
FIG. 5 illustrates a diagram of an example active window that has a second icon activated by a user to display a list of one or more links related to the content in the active window.

FIG. 5 illustrates a diagram of an example active window that has a second icon activated by a user to display a list of one or more links related to the content in the active window. A second icon 512 embedded by the User Interface in the in the title bar 516 of the application operating in the active window 508 may be associated with the related Available Products links to the text of the content. The User Interface may display a list of, for example, six links of available products 520, such as books, related to the content in the active window 508 when the user activates the second icon 512. The information about the available products may be in a structured or unstructured format. The search program allows vendors and consumers the ability to buy/sell products based on their relevance to a user's particular viewing habits/interests.

Figure 6:
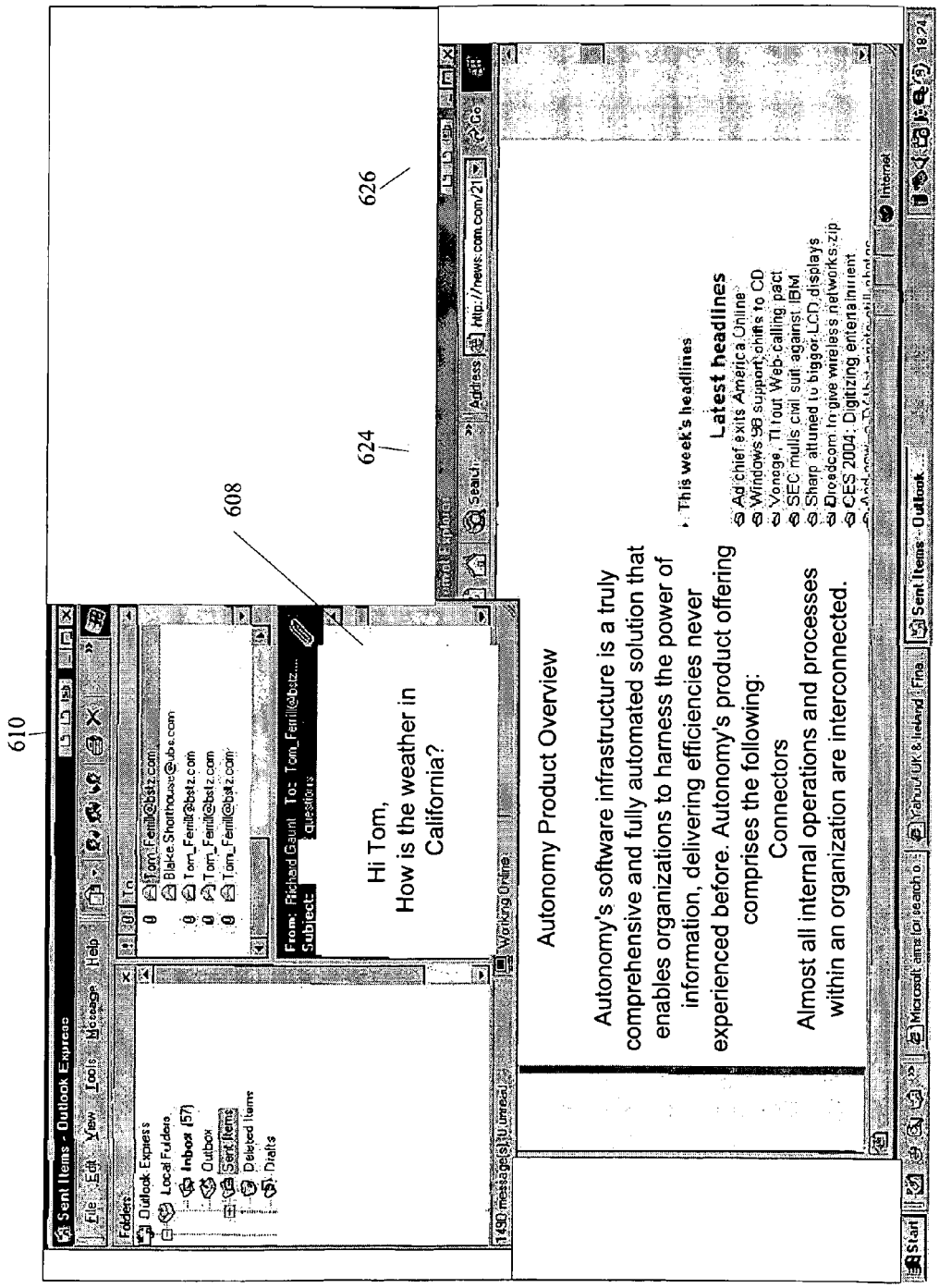
FIG. 6 illustrates a diagram of an example display screen displaying multiple windows with icons embedded in the applications operating in each of the windows.

FIG. 6 illustrates a diagram of an example display screen displaying multiple windows with icons embedded in the applications operating in each of the windows. An application, such as an e-mail program, may be operating in a first window 608. The user interface may have embedded three icons 610 into an unobtrusive spot in that e-mail application. An application, such as an Internet Browser program, may be operating in a second window 624. The user interface may have embedded three icons 626 into that Internet Browser application. The first window 608 may be displayed over the second window 624 to indicate that the first window 608 is the currently the active window.

Figure 7:
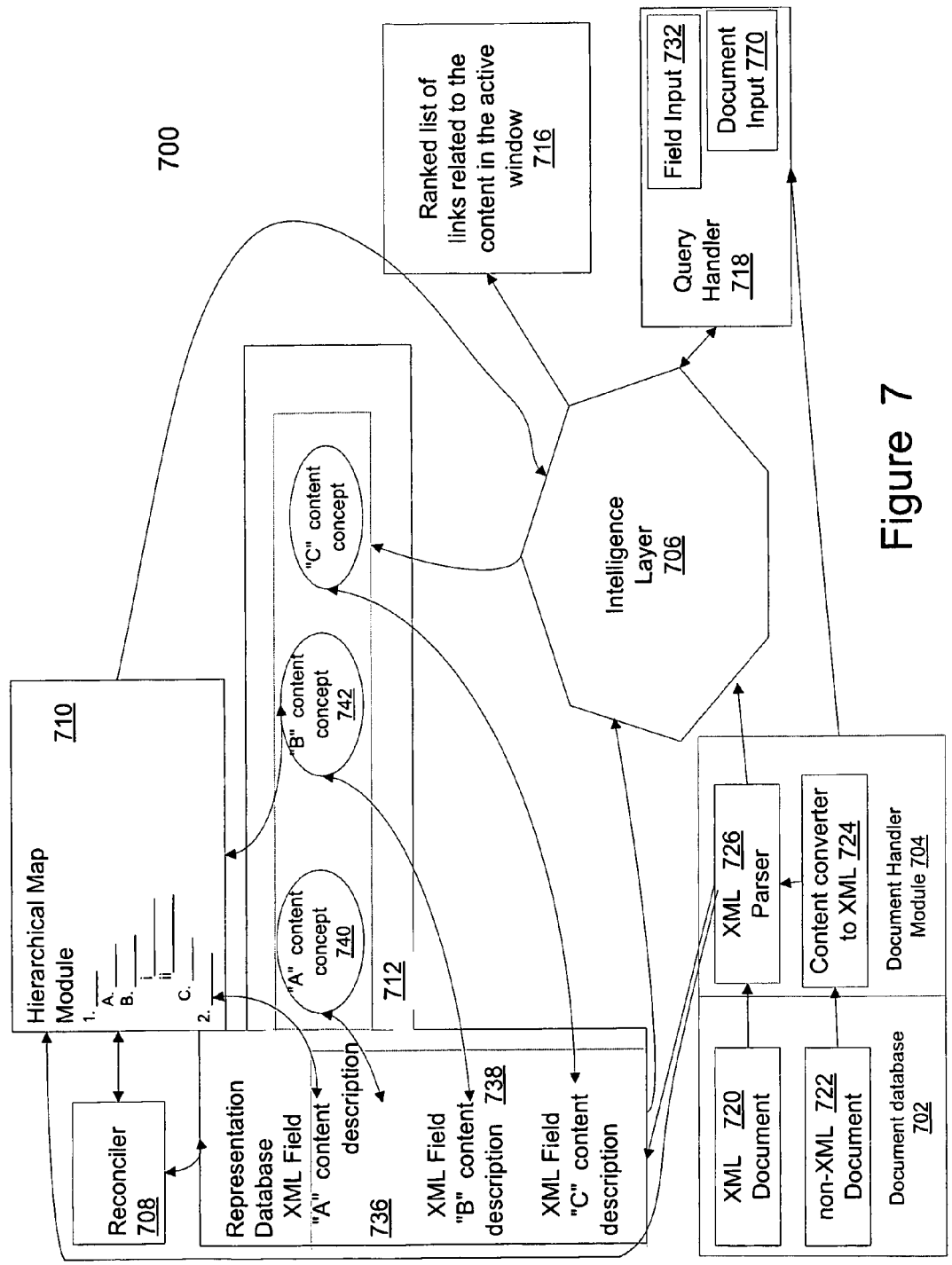
FIG. 7 illustrates a block diagram of an embodiment of an engine to generate a ranked list of related documents to a reference document and a link to each of the related documents.

FIG. 7 illustrates a block diagram of an embodiment of an engine to generate a ranked list of related documents to a reference document and a link to each of the related documents. In an embodiment, the engine 700 may include a document database 702, a document handler module 704, an intelligence layer 706, a reconciler 708, a hierarchical map module 710, and a representation database 712. The engine 700 also interacts with the User Interface to display a ranked list of related documents 716 and a query handler 718.

The search program may submit the text of a document in the active window through the document handler module 704 to the document input 730 of the query handler 718. Also a document from the document database 702 may be delivered into the document input 730. The document may be selected from an existing XML document 720 or non-XML document 722. Thus, the input document may be either a document from the document database 702 or a document supplied by the user to be the content for the document input 730. The document submitted to the document handler module 704 can be an XML document or a non-XML document.

If the document is not in an XML format, then the input document is sent to a content converter 724 located in the document handler module 704. The content converter 724 converts the input document to an XML format. This example engine is coded to work with an XML schema but could also be coded to work with other schemas.

Thus, the search program utilizing the engine 700 has the ability to relate all types of content to one another (e.g. news to product descriptions, products to people's interests, people to other people, categories to web content, etc) automatically, so there is no need for a manual process of editing/categorizing documents or the on-screen material.

The search program utilizing the engine has the ability to do the above from almost any Windows type application (e.g.

Explorer, MS Word, Mail, Lotus Notes, other word processing applications, Powerpoint etc) with no change to that application. The search program uses the text on the screen from the application.

An embodiment of the content converter 724 module uses pattern recognition type software to automate the generic categorization and XML-tagging of the unstructured, non-XML document. Next, if the input document is an XML structured document 720, or after a non-XML-structured document 722 has been converted to an XML structure, then the XML document is parsed by an XML parser 726.

The XML parser 726 contains software that reads an XML document, identifies the XML tags, and changes the XML tags and the hierarchical information of the XML document into information accessible to a programming language. The identification of all the XML tags allows an action to be taken on each element of an XML document. The XML parser 726 sends the parsed XML document to the hierarchical map module 710, the representation database 712, the intelligence layer 706, and to the document input 730 of the query handler 718.

The hierarchical map module 710 receives the parsed XML document. The hierarchical map module 710 stores a model of the original hierarchical structure of the XML document or converted non-XML document. For an example of a hierarchy of a document, a particular play may contain multiple acts, each act may contain several scenes, and each scene may one or more speeches by a particular character in the play. The hierarchical map module 710 analyzes the original hierarchical structure of the original XML document 720 or converted non-XML document to determine the purpose of the tagging schema and the related information. The hierarchical structure provides some indications of the tag meaning. The hierarchical structure can also provide some indications of the meaning of the content associated with the tag. For example, content occurring in a section heading of the hierarchical structure has a different meaning from content occurring in a footnote of the same hierarchical structure of the same document. Similarly, the content in a figure caption has different hierarchical structure than content in a database, table, etc.

The hierarchical map module 710 then stores the analyzed model of this particular XML document. The hierarchical map module 710 sends this model to the intelligence layer 706. The hierarchical map module 710 also sends this model to the reconciler 708 in order to assist in determining an understanding of the various elements of the XML schema such as tags, content, etc. as will be described in more detail below. The reconciler 708 assists in determining a cross-reference between different elements of the XML schema that have a similar conceptual meaning. Thus, the hierarchical map module 710 assists in supporting multiple concurrent content sources each source having a different schema, with information from each source being able to retain its inherent structure.

Next, the intelligence layer 706 analyzes the content of the parsed XML document. The intelligence layer 706 compares the representation of the concepts embodied in the content of the parsed XML document are compared to the representations stored in the representation database 712. In an embodiment, if a representation, or sometimes referred to as a concept, from the parsed XML document is not in already in the representation database 712 then the representation is added to the representation database 712. If a representation from the parsed XML document is already in the representation database 712, then the intelligence layer 706 dynamically refines the instance of the representation by comparison to a historical instance of the same representation in the representation database 712. The intelligence layer uses the historical weight values of each term in the representation to refine the weight values in the current instance of the same representation. The refined instance of the representation is then stored in the representation database 712 along with the historical instance of the representation.

In an embodiment, the intelligence layer 706 uses a combination of the following techniques to analyze the content of the parsed XML document in order to extract the concepts embedded within the content. In an embodiment, the intelligence layer 706 analyzes words as a value in sequences of algorithms to compare the relational probabilities between word clusters. In an embodiment, the intelligence layer 706 can also use an inverted word list in a well-known manner to assist in relational probabilities. In an embodiment, the intelligence layer 706 may use pattern-matching techniques. In an embodiment, the intelligence layer 706 may also use human language and grammar modeling to assist in determining the category of the content and to extract the concepts embedded within the content.

The intelligence layer 706 can use any or all of above techniques to determine 1) which particular combination of concepts do occur within a document under analysis in question and 2) based upon the particular combination of concepts that do occur within the document in question, then the intelligence layer 706 may estimate that the document in question relates to a specific subject. In this manner, intelligence layer 706 extracts a document's conceptual essence and encodes the unique "signature" of the key concepts. Based upon the combination of these technologies, the intelligence layer 706 may enable a computer to understand that an X percent of probability exists that the content under analysis is about a specific subject. In an embodiment, the intelligence layer creates a representation for each field in the document under analysis. Therefore, a multifaceted XML document is analyzed the same way as single subject XML document is analyzed.

As noted above, in an embodiment, the intelligence layer 706 uses the following techniques: inverted word lists; Adaptive Probabilistic Concept Modeling; and pattern matching techniques.

In an embodiment, one of the techniques the intelligence layer 706 uses is an inverted word list. An inverted word list is a data management file that is indexed on many of the attributes of the data itself. The inverted word list points to other words, which contain similar meaning or context as themselves.

In an embodiment, one of the techniques the intelligence layer 706 uses is Adaptive Probabilistic Concept Modeling. Adaptive Probabilistic Concept Modeling analyzes the correlation between features found in relevant documents to determine higher relevance concepts and documents. Concepts important to sets of documents can be determined to allow new documents to be accurately classified. In an embodiment, the intelligence layer 706 may use multiple algorithms, such as the Volterra series and Linear Weight Networks, to determine the key terms and concepts contained within the document. The intelligence layer 706 identifies these key concepts in the document along with the associated frequency and relationship of terms most closely correlated with each key concept. In an embodiment, the key concepts and correlations are stored in the representation database 712 as representations. The representations are software abstracts that can then be used to locate other instances of the pattern of terms and contextual relationships that represent a given idea.

The intelligence layer 706 then uses the derived understanding of the instance of the representation to further refine the historical instance of the representation. Thus, the effectiveness of the refinement with the historical instance of the representation improves over time as their focus on a specific topic becomes more comprehensive and sophisticated. A historical instance of the representation can become skilled at recognizing a relevant topic independently of the words used to describe the particular idea.

In an embodiment, the intelligence layer 706 may also use the technique of pattern-matching (non-linear adaptive digital signal processing), utilizing Bayesian Inference and Claude Shannon's principles of information theory. The intelligence layer 706 identifies the patterns that naturally occur in text, based on the usage and frequency of words or terms that correspond to specific ideas or concepts. Based on the preponderance of multiple patterns over another in a portion of unstructured information, the intelligence layer 706 can determine that there is particular probability that a document in question is about a specific subject. In this manner, the intelligence layer 706 may extract a document's conceptual essence, encode the unique "signature" of the key concepts, and then enable a host of information operations to be performed on the document automatically.

Bayesian Inference centers on calculating the probabilistic relationship between multiple variables and determining the extent to which one variable impacts another. A typical problem is to judge how relevant a document is to a given query or user profile. Bayesian theory aids in this calculation by relating this judgment to details that we already know, such as the model of a user. More formally, the resulting, "a posteriori" distribution $\rho(\theta|\chi)$, which is applicable in judging relevance can be given as a function of the known "a priori" models and likelihood $$P(\theta \mid \chi) = \frac{P(\chi \mid \theta) * P(\theta)}{\sum_{\theta' \in \Theta} P(\chi \mid \theta') * P(\theta')}$$

Extensions of the Bayesian Inference theory go further than the relevance of the information for a given query against a text. The results of such algorithms determine the correlation between features found in documents relevant to a user profile, finding new concepts, and other related documents.

Shannon's Information Theory is a mathematical foundation for digital communications systems. Shannon's Information Theory allows "information" to be treated as a quantifiable value in communications. Consider the basic case where the units of communication (for example, words or phrases) are independent of each other. If $\rho_i$ is the probability of the $i^{th}$ unit of communication, the average quantity of information conveyed by a unit, Shannon's entropy or measure of uncertainty is:

$$w^t_{INN} = (0\ 0\ 0\ 0\ 1\ 1)$$

This formula reaches its maximum when the probabilities are all equal; in this case, the resulting text would be random. If this is not the case, the information conveyed by the text will be less than this maximum; in other words, there is some redundancy. This result is then extended, by more sophisticated mathematical arguments, to when units are related.

Human languages contain a high degree of redundancy. A conversation in a noisy room can be understood even when some of the words cannot be heard; the essence of a news article can be obtained by skimming over the text. Information theory provides a framework for extracting the concepts from the redundancy.

In an embodiment of the intelligence layer 706, as the frequency of a unit of communication is reduced, the amount of information that unit of communication conveys is increased. Therefore, the ideas that are more rare within the context of a communication tend to be more indicative of the idea's meaning. This theory assists the intelligence layer 706 in determining the most important (or informative) concepts within a document.

Language and grammar modeling techniques may also be employed to assist in identifying the key concepts embedded in a document. The intelligence layer 706 treats words as abstract symbols of meaning, deriving its understanding through the context of their occurrence rather than a rigid definition of grammar. The intelligence layer 706 contains a statistical understanding of the patterns of most human languages, and can be easily trained on the patterns of any language. In an embodiment, the intelligence layer 706 may be refined to work with content in any human language of the user's choice.

The intelligence layer 706 may also use a few language-specific options to fine-tune its performance.

The intelligence layer 706 may employ stop lists. In every language there are "empty words", which on their own do not carry any significant meaning. In grammatical terms these would normally be prepositions, conjunctions, auxiliary verbs, etc. In English for example, words such as "the", "a", "and", "to", etc.

A stop list assists the intelligence layer 706 in ignoring such type of words. This results in faster processing and less use of memory and storage capacity, as stop list words do not need to be stored. In an embodiment, due to the eventual results of the combined technologies being based on statistical analysis, strictly speaking, stop list configuration is not necessary but it helps. Such words will obviously differ depending on the human language used. In an embodiment, the intelligence layer 706 includes a set of stop lists for most commonly used human languages.

The intelligence layer 706 may also employ stemming. In most languages, certain forms of a word can be stripped or converted to obtain the main stem or core of the word or base word. In English for example, run, runner and running could all be stripped down to the word stem word "run", without significant loss of meaning. The intelligence layer 706 has the ability to use stemming to further enhance concept determining.

The intelligence layer 706 may also employ word breaking. Certain human languages, such as Thai, Japanese, Chinese, etc. have text in which sentences are written without the use of spaces to delimit individual words. The individual words are normally discerned by its context. In an embodiment, the intelligence layer 706 is mostly language-independent, in that the intelligence layer analyses word patterns in a particular context, yet the intelligence layer 706 still has to know what the individual word is. In such circumstances, intelligence layer uses a word-breaking application programming interface (API) to perform this block.

The intelligence layer 706 may make use of computer linguistics, keywords, pattern matching algorithms and probability theory to automating the processing of unstructured information. Further, the intelligence layer 706 receives inputs from the representation database 712 and the hierarchical map module 710 that assist the intelligence layer 706 in understanding the content, the purpose of each tag, the tagging schema, as well as the tag and the corresponding related information. The intelligence layer 706 may then compare the relational probabilities from all these techniques to determine the ideas conveyed by the content.

In an embodiment, the intelligence layer 706 may use all of the above techniques while generating a representation. In an embodiment, the intelligence layer generates a representation for each field in an XML document. The XML document may be either the reference XML document or one of the related XML documents. The representation may consists of two parts 1) a stored portion of the key terms and weights associated with each term and 2) a link to the stored portion of the XML Field content description. The descriptive content of a field within the XML document is input to the intelligence layer 706. Then, the intelligence layer 706 compares key terms from this instance of the representation to the key terms from all other instances of the field having the same tag-value pair in the representation database 712. Once the intelligence layer understands that the content associated with the field relates to a particular subject matter the intelligence layer 706 may automatically assign a tag-value pair to the representation. The intelligence layer 706 automatically inserts the appropriate XML tags to each representation. The intelligence layer 706 can also link the content concepts (terms and mathematical weights) and content field representations to cross-reference each other. This ensures that all of the representations relating to the same subject matter will have a common tag-value pair.

Each instance of a representation having the same tag-value pair may have differing key terms from descriptive content associated with that instance of the tag-value pair. For example, a first tag-value pair of "Vehicle=Car" may have the associated content of "1967 Ford Mustang with four doors, rear wheel drive, and V-8 5.0 liter engine." A second tag-value pair of "Vehicle=Car" may have the associated content of "1988 Ford Taurus with rear wheel drive, V-6 3.0 liter engine, and air conditioning." Note, the unstructured content descriptions may contain many more terms than these short examples. In an embodiment, the more frequent a key term appears in the descriptive fields of these common tag value pairs, the more relevant and higher assigned weight that word/term has in the historical representation of that tag-value pair.

The intelligence layer 706 contributes to the automatic categorization and cross-referencing of information, thereby dynamically improving the efficiency of information retrieval and enabling the dynamic personalization of digital content. The intelligence layer's 706 conceptual understanding of content in an XML document enables the intelligence layer's 706 to automatically insert XML tags and links into documents, based on the concepts contained in the information. This eliminates the manual cost. Also, the intelligence layer 706 enables XML applications to understand conceptual information, independent of variations in tagging schemas or the variety of applications in use. This means, for example, that legacy data from disparate sources, tagged using different schemas, can be automatically reconciled and operated upon. This reduces human error in cross-referencing content.

In an embodiment, an increase in efficiency of information retrieval and enabling the dynamic personalization of digital content occurs because the intelligence layer 706 performs all four of the functions, contextual analysis, concept extraction, automatic categorization, and cross-referencing of information.

In an embodiment, the intelligence layer 706 uses a set of examples of documents within specified categories to assist in categorizing a particular XML field content description or content concept user. The intelligence layer 706 then determines which categories the new documents will best fit into, categorize them accordingly and add the requisite XML tags. All of this is done automatically and in real time. The representation database 712 then stores the tagged XML files into a particular file repository based on matched category.

The representation database 712 consists of XML field content descriptions 736-738 and content concepts of those XML field content descriptions 740-742. The representation database 712 receives data from the XML parser 726. The representation database 712 sends data to and receives data from the intelligence layer 706, the hierarchical map module 710, and the reconciler 708. As illustrated, the representation database 712 stores representations of XML field content descriptions 736-738 and content concepts 740-742 of those XML field content descriptions. For example, the content map module may store a representation consisting of XML field "A"content description 736 and the "A" content concept 740. In an embodiment, a representation consists of both an XML field content description and a content concept. In an embodiment, the representation database 712 stores these representations for all of the content descriptions in the different elements within the XML/converted XML document.

The representation database 712 receives each block of unstructured information within a parsed XML document from the XML parser 726. The representation database 712 sends each block of unstructured information within an XML document to the intelligence layer 706 for analysis. The intelligence layer 706 automatically marks the data with an XML tag and any cross-referencing information. These XML tags enable information to be reused and maintained and to create an internal common categorization of the semi-structured and unstructured information. The intelligence layer 706 sends back an assigned representation which the information fits within. The representation database 712 stores a representation of the information blocks and stores the representations of each block of unstructured information within an XML document. The reconciler 708, hierarchical map module 710 and intelligence layer 706 may all refer to these representations while performing their operations.

The hierarchical map module 710 stores a model of the original hierarchical structure of the parsed document. In an embodiment, all of the representations contain cross-referencing links to each other.

Through the use of the intelligence layer 706, representation database 712, hierarchical map module 710, and reconciler 708, a computer system can be enabled to automatically form an understanding of a page of text, web pages, e-mails, voice, documents and people and automate operations on the information from these various sources.

The query handler 718 has a document input 730. The document input 730 allows the user or the text analyzing module to submit text from a document, such as the text in the active window, through the document handler module 704. The intelligence layer 706 may determine documents that are relevant to the content under analysis by comparing the instance of the representation for the content associated with the reference document to all other instances of representations having the same common tag-value pair stored in the representation database 712. The intelligence layer 706 may also compare the content under analysis to representations that are close in idea distance. The intelligence layer 706 may also compare the content under analysis to representations dynamically created for documents stored in the document database 702. The intelligence layer 706 may also compare the content under analysis to representations that have been linked as similar in content to the tag-value pair under analysis.

The relevant documents are ranked corresponding to their similarity to the representation of the query. This includes representations that are semantically similar to the representation for the reference document. Then, the results of the ranked, relevant documents are sent to the ranked list of links related to the content in the active window 716. The ranked list of links related to the content in the active window 716 contains a hot link, such as a hyperlink to each related document/product.

The field input 732 allows a user or the application used by the user to specify which field in either or both the reference XML document and the related XML documents to be analyzed for relevant content. In an embodiment, the user may specify at the time the query is generated the particular field in an XML document to use as the content of the query. In an embodiment the user may specify multiple fields of interest. The field input 732 grants the user the ability to target their search and response to the search to the exact type of information sought.

Thus the user may eliminate an overbroad return of non-relevant information by specifying the particular field or particular fields of interest that the user wishes to use as the query or include in the search. Since the system 700 uses concepts in the content of the query rather than the exact key words, the system 700 then generates a ranked list of links related to the content in the active window 716 containing the most salient information to the content submitted to the document input 730. The content the system 700 analyzes may be a sentence, paragraph or page of text, the body of an e-mail, a record containing human readable information, or the derived contextual information of an audio or speech snippet.

The reconciler 708 exchanges data with the hierarchical map module 710 and the representation database 712. The reconciler 708 uses a routine to check to see if the schema of a first parsed document should be cross-referenced with the tagging schema of a second parsed document. The reconciler 708 provides schema reuse, so that tags referenced in one schema can be used in other schemas, by providing an input into the intelligence layer 706 to automatically insert the appropriate links. Thus, the reconciler 708 allows documents having different XML schemas to be fed into the system. In an embodiment, the system 700 gains a conceptual understanding of each schema and the content within each tag-value pair in order to make each schema the equivalent. Thus, the system 700 then automatically assigns the representation within the appropriate internal representation. This means, for example, that legacy data from disparate sources, tagged using different schemas, can be automatically reconciled and operated upon. Different schemas may use different nomenclature for tag names. For example, a structure that contains "Customer/name/last" and "Customer/name/family" could be mapped together by the reconciler 708 because last name and family name are semantically the same.

In an embodiment, the intelligence layer 706 may use pattern-matching algorithms as follows.

A document maybe viewed as a vector. One way of posing the problem is to consider the document in a high dimensional space, each dimension of which is associated with a term from the corpus (the total group of documents). A document can be represented in this space as a point the coordinates of which arise from the presence or absence of each of the corpus terms in the particular document. This leads to a very high dimensionality space, as there are many tens of thousand of terms in a practical corpus. In practice, it is not necessary to use all the terms from a corpus, as many terms such as 'the'are so common as to lend little to the solution of the problem. Typically schemes operate on the rarer words present in a document on the term infrequency basis; that is, rarer words are more likely to carry the meaning of the document. It is only these rarer terms that are used. Various other ad hoc term selection schemes are in use. Other term related indices such as the frequency of the term or inverse frequency of terms in a document may be represented in space as the point. In an embodiment the terms may be a single term, high order term, noun phrases, proper names, etc.

On this basis, a document or tag-value pairs can be compared by looking at the distance in this space between the points representing each document or tag-value pair. This is an example of a vector-based technique. However, looking at the distance in this space between points representing documents or tag-value pairs is only one method to employ a Vector based method. Representations can also be compared in a similar manner.

Higher Order Terms

Often it is not individual terms that convey meaning but combinations of these terms. Often one term acts as a qualifier and changes the meaning of another term present. For example the term 'cat' with no a priori information is probably something to do with felines; however in the presence of the term 'burglar' its meaning in effect changes. Such combinations are higher order terms. Use of a higher order term may remove some term dependence and term independence assumptions that are typically made.

Using * to denote an operator, such a combination of terms for a document such as:

"the dog, the cat and the burglar"

may be represented based on order as:

$1^{st}$ order 'cat', 'dog', 'burglar'
$2^{nd}$ order'cat*dog', 'cat*burglar', 'burglar*dog', 'cat*cat', 'cat*dog'
$3^{rd}$ order'cat*burglar*dog'

With a reasonable number of terms, it is clear the number of higher order terms can explode rapidly.

Concepts and Terms

The concept of higher order terms may be efficiently extended by, rather than operating on all higher order combinations, grouping higher order terms into concepts and then defining these concepts as new terms in the process in their own right. Whilst being efficient, identification of these concepts is non-trivial. For example, if a new concept term A1='Cat*burglar' is considered, then the higher order mixed term A1*'police' may be found to be useful.

Conceptually, the problem is one of theoretically starting with all terms, generating higher order terms and selecting only those for the classifiers which contribute most to accurate results. Such an approach is an example of self-structured pruning of the recognition space.

The representation of weighted terms and higher order terms can be expressed as a Volterra series.

An Exemplary Algorithm

In adaptive term modeling, it is important to eliminate the need for a priori information, as the non-linear relationships necessary to perform many of the problems addressed are too complex in general to be adequately described explicitly.

In one embodiment, a model is created which is as general as possible. This increases and potentially optimizes its performance through the adaptive process on training data, to remove problem specific structural redundancies in the network structure, in order to reduce computational load.

In order to perform a general transfer function, a very large number of terms from the Volterra series may be needed. Experience has shown that many real problems may however be solved with limited order networks of order one or two. It has also become apparent that it is very difficult to predict in advance which terms will be irrelevant and remove them.

Thus, the problem is to identify the redundant terms and remove them and so restructure the network.

Linear Weight Networks

They are composed of a non-linear expansion operation on the input document vector x to give an extended vector v containing higher order terms and concepts. This may be represented below as:

$$v=F(x)$$

with F(x) being the non-linear space extending function. In the Volterra case, the vector may be written in the form of a polynomial expansion, such as follows:

$$v_i=(1,x_1,x_2,x_1x_2,x_1^2,x_2^2,x_1^2x_2,\ldots)$$

A weighted linear sum using a set of weights w is then performed in the extended space to give the output y, which may be subtracted from the desired output d to give an error $\epsilon$ as follows:

$$\epsilon=d-y=d-w^t v$$

It can be shown that the mean square error is:

$$E[\epsilon^2]=E[(d-w^t v)]=\sigma^2-2w^t p+w^t R w$$

where R is the autocorrelation matrix of the data in the non-linearly extended vector space, similarly P is the cross correlation vector between the desired d signal and the non-linearly expanded data, and $\sigma^2$ is the variance of the desired response.

In general for the pattern recognition problem in which the network is performing well, the network is degenerate or rank-deficient. That is, R is singular or near singular.

A single solution may still be obtained by the application of Singular Value Decomposition theorem, which states:

For matrix A of rank q, there are two unitary matrices X and Y such that:

$$\text{where: } Y^H A H = \begin{pmatrix} \Sigma & 0 \\ 0 & 0 \end{pmatrix}$$

$$\text{and: } \Sigma q = \text{diag}(\sigma_1, \sigma_2, \ldots, \sigma_q) \quad \sigma_1 \geq \sigma_2 \geq \ldots \geq \sigma_q > 0$$

This theorem can be used to solve for the weight vector even when R is singular. More generally, the weight equation may be rewritten:

$$w=A^m b$$

where $A^m$ is the Moore-Penrose generalized inverse or pseudo inverse of matrix A. Singular Value Decomposition can give a unique solution to the equation, giving the one solution with the minimum-norm.

The pseudo inverse of the matrix A may be defined as:

$$A^m = X \begin{pmatrix} \Sigma^{-1} & 0 \\ 0 & 0 \end{pmatrix} Y^H$$

where:

$$\Sigma^{-1} = \text{diag}(\sigma_1^{-1}, \sigma_2^{-1}, \ldots, \sigma_q^{-1})$$

and q is the rank of the matrix A. It is shown that $$A^m = \sum_{i=1}^{q} \frac{x_i}{\sigma_i^2} x_i^H A^H b$$

The equation may be used by first computing the singular values of the data matrix A and the associated singular vectors $x_1 \ldots x_q$ and substituting them into the above equation to give w. This gives a numerically well behaved method which may even be used for rank deficient systems. In minimizing the norm coefficients which proceed the irrelevant terms they will be set to zero coefficients and may be removed. This may be defined as Type I redundancy.

Self Structuring by Type II Redundancy Removal

A novel term selection method is described below which allows for finding weight vectors containing at most q non-zero weights where q is the rank of R. Let N(R) and R(R) be the null space and range of R respectively. Consider choosing a weight vector w for a standard Volterra Connectionist Model (VCM) for which, $$Rw=p$$

where R is an n×n symmetric matrix of rank q<n and p∈R (R) such that there are an infinite number of possible solutions. The standard algebraic technique of changing R into an echelon matrix, shows that there are (n−q) weights which can be set arbitrarily, the remaining weights being determined in terms of the actual values used.

Setting the arbitrary weights to zero and the remaining weights according gives a valid solution of an appropriate solution is gained using the SVD of R. As R is symmetric, $$R=[Y_1\ Y_2]\Sigma X^t \quad (1)$$

where the columns of $Y_1$ correspond to the q non-zero singular values and span R(R) and the columns of $Y_2$ correspond to the (n−q) zero singular values and span N(R). If $\{u_i\}$ are the columns of $Y_2$ and $w_{min}$ is the minimum norm solution of (1) then the general solution is, $$\tilde{w} = w_{min} + \sum_{i=1}^{(n-q)} a_i u_i \quad (2)$$

for arbitrary real numbers $a_i$. As (n−q) weights are arbitrary it is always possible to construct a set of equations, for which a solution exists, of the form, $$\begin{pmatrix} - & u_2^{(1)} & - \\ - & u_2^{(2)} & - \\ & \vdots & \\ - & u_2^{(n-q)} & - \end{pmatrix} \begin{pmatrix} a_1 \\ a_2 \\ \vdots \\ a_{n-q} \end{pmatrix} = - \begin{pmatrix} w'_1 \\ w'_2 \\ \vdots \\ w'_{n-q} \end{pmatrix} \quad (3)$$

where $\{u_2^{(i)}\}$ is a subset of the rows of $Y_2$ and $\{w'_i\}$ are the corresponding weights in $w_{min}$. Substituting the solution in equation (2) above yields a weight vector $\tilde{w}$ with at least (n−q) zero weights. In practice, it is found that settings (n−q) weights to zero may cause other weights also to be set to zero, thereby further simplifying the VCM. As weights are being removed by canceling them using null vectors, the corresponding non-linearities are called Inherent Null space Non-linearities. These Inherent Null space Non-linearities are an example of Type II redundancies.

In constructing (3), the columns of Y corresponding to strictly zero singular values were used. In practice, it is generally found that at least one singular value is close to but not equal to zero.

As it was assumed that equation (1) has a solution the VCM has a mean square error of $J=E[\epsilon^2]$, and it is interesting to see how this is affected if the columns of Y corresponding to non-zero singular values are used in calculating using (2) and (3). In this case, $$\tilde{w} = w_{\min} + \sum_{i=1}^{(n-q)} a_i u_i + \sum_{i=1}^{k} b_i u'_i$$

where k vectors $\{u'_i\}$ corresponding to non-zero singular values $\{\sigma_i\}$ are selected. It is easy to show that, if the new set of equations of the form of (3) has a solution, then the new mean square error J' is, $$J' = J + \sum_{i=1}^{k} b_i^2 \sigma_i$$

An algorithm using the above method can be used to successfully remove Type II redundancy.

The Type I Case

For a simple example, a two pattern problem is addressed. A second order extension is used:

$$y = w_0 + w_1 x_1 + w_2 x_2 + w_3 x_1 x_2$$

The patterns are alternately presented and the smallest coefficient after 50 presentations is shown:

Indices of −2 and 1 were used except for the fourth run in which −1 and 1 were used.

| Pattern 1 | Pattern 2 | Redundancy | Eliminated Weight |
|---|---|---|---|
| (2, −1) | (−1, 2) | $X_1 X_2$ | $W_3$ |
| (2, −1) | (−2, −1) | $X_2$ | $W_2$ |
| (2, −1) | (2, 2) | $X_1$ | $W_1$ |
| (2, −1) | (−3, 2) | 1 | $W_0$ |

The results demonstrate that the network correctly eliminates unnecessary terms and so can solve a problem with a smaller network.

The Type II Case

This demonstrates, using a simple example, that the removal of Type I's is not necessarily equivalent to the removal of Type II's. Consider training a two input VCM with second order extension and no output mapping to output 1 when the input vector is either.

$$x'_1 = \left( \frac{1}{\sqrt{2}} \; \frac{1}{\sqrt{2}} \right)$$

or $$x'_2 = \left( \frac{-1}{\sqrt{2}} \; \frac{-1}{\sqrt{2}} \right)$$

Only two training examples, $x_1$ and $x_2$, are used. Under these circumstances, two obvious models for data are available. Firstly, a circle of radius 1, and secondly, a line through the training points and the origin (see FIG. 2). The extended input vector is of the form, $$x' = (1 \; x_1 \; x_2 \; x_1^2 \; x_1 x_2 \; x_2^2)$$

The minimum norm solution in this case is, $$w'_{min} = (0.57 \; 0 \; 0 \; 0.29 \; 0.29 \; 0.29)$$

and thus has four non-zero weights. Removal of Type II's leads to weight vector, $$w'_{INN} = (0 \; 0 \; 0 \; 0 \; 1 \; 1)$$

which has only two non-zero weights and thus gives a simpler model than that obtained using the minimum norm solution. In this case the simplest possible solution, which has only a single weight, has not been found. In practice it is found that there may be more than one way of setting (n−q) weights to zero in some problems and it is suggested that in this case an alternative solution exists, which was not found by the current algorithm, which allows more than (n−q) weights to be set to zero as explained in section entitled Self-Structuring by Type II Redundancy Removal.

In an embodiment, the software used to facilitate the search program can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.

In the above description, numerous specific details were set forth, such as examples of specific software modules and languages, components, connections, etc. in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

We claim:

1. A method, comprising:

analyzing text from content in an active window;

executing a query on the content in the active window without a user having to request the query;

embedding a first icon on a location of a display that also displays the content in the active window, where the first icon represents a category of links related to the content in the active window;

generating a list of links related to the content in the active window;

displaying the links in the list of links when the user activates the first icon;

controlling how and where the first icon and the generated list of links is physically presented to the user on the display so as to be visually unobtrusive to the user in relation to the content in the active window;

assigning a relevance rating to the links from the list of links from a scale of how relevant a given link is in relation to the content, wherein a given link must have a relevance rating that is equal to or above a minimum threshold relevance value in relation to the content before alerting the user by highlighting its corresponding icon; and embedding two or more icons, including the first icon, in a title bar of an application operating in the active window to be located in a visually unobtrusive area of the display relative to the content in the active window, wherein a user interface highlights the first icon if one or more of the links related to the content exceeds the minimum threshold relevance rating to the content in the active window in order to unobtrusively visually attract the user's attention to the one or more links, wherein the minimum threshold relevance value is adjustable by a user.

2. The method of claim 1, wherein each icon represents a different category of links related to the content.

3. The method of claim 1, further comprising:

calculating the relevance rating for each link, wherein a programmer establishes an initial threshold relevance value for the minimum threshold relevance.

4. The method of claim 1, further comprising:

generating links related to the content in the active window from information stored locally on the user's hard drive as well as information stored on one or more servers in a network.

5. The method of claim 4, further comprising:

generating links to products related to the content in the active window.

6. The method of claim 1, further comprising:

when the user activates the first icon, displaying only the links in the list of links related to the content that exceed a minimum threshold relevance rating to the content in the active window.

7. The method of claim 1, further comprising:

displaying the list of links related to the content when the user activates the first icon.

8. The method of claim 1, further comprising:

displaying a summary about a first link related to the content when a user moves a cursor over the first link.

9. The method of claim 1, further comprising:

analyzing the actual text when the text is being displayed in the active window.

10. The method of claim 1, further comprising:

analyzing all of the text in a document when the window containing the document is made the active window.

11. The method of claim 1, further comprising:

generating a set of most relevant terms from the text in the content, wherein the set of terms include single terms and higher order terms; and executing the query on the set of most relevant.

12. The method of claim 1, further comprising:

generating a set of most relevant terms from the text in the content through application of a Bayesian algorithm on the text; and executing the query on the set of most relevant terms.

13. The method of claim 1, wherein the first icon represents a category of other users of a product related to the content in the active window.

14. The method of claim 1, wherein the first icon represents a category of information that is tangentially related to the content in the active window.

15. An article of manufacture being one or more machine-readable media that store instructions, which when executed by a machine, cause the machine to perform operations comprising:

analyzing text from content in an active window without a user requesting the analysis;

executing a query on the content in the active window without a user having to request the query;

generating a list of links related to the content in the active window; and controlling how and where a first icon and the generated list of links is physically presented to the user on the display so as to be visually unobtrusive to the user in relation to the content in the active window by embedding in a title bar of an application operating in the active window a first icon associated with the list of links, displaying the list of links related to the content when a user activates the icon, calculating and assigning a relevance rating to the links from the list of links from a scale of how relevant a given link is in relation to the content, wherein a first link must have a relevance rating that is equal to or above a minimum threshold relevance rating in relation to the content before alerting the user by highlighting its corresponding first icon, and highlighting the first icon when one or more of the links related to the content is equal to or above the minimum threshold relevance level in relation to the content in the active window, wherein the minimum threshold relevance value is adjustable by a user.

16. The article of manufacture of claim 15, storing instructions, which when executed by the machine, cause the machine to perform further operations, comprising:

embedding two or more icons in the application operating in the active window including the first icon, wherein the first icon represents a first category of links related to the content and a second icon represents a second category of links related to the content, wherein the title bar any area near the Maximize/Minimize buttons for that application.

17. The article of manufacture of claim 15, storing instructions, which when executed by the machine, cause the machine to perform further operations, comprising:

generating links related to the content the active window from information stored locally on the user's machine as well as information stored on one or more servers in a network.

18. The article of manufacture of claim 15, storing instructions, which when executed by the machine, cause the machine to perform further operations, comprising:

when the user activates the first icon, displaying only the links in the list of links related to the content that exceed a minimum threshold relevance rating to the content in the active window.

19. The article of manufacture of claim 15, storing instructions, which when executed by the machine, cause the machine to perform further operations, comprising:

generating a set of most relevant terms from the text in the content through application of a Bayesian algorithm on the text; and executing the query on the set of most relevant terms from the text in the content.

20. The article of manufacture of claim 15, storing instructions, which when executed by the machine, cause the machine to perform further operations, comprising:

analyzing the actual text in the window by intercepting the text as the text is displayed.

21. An apparatus, comprising:

means for analyzing text from content in an active window without a user requesting the analysis;

means for executing a query on the content from the active window without a user having to request the query;

means for generating a list of links related to the content in the active window;

means for controlling how and where the first icon and the generated list of links is physically presented to the user on the display so as to be visually unobtrusive to the user in relation to the content in the active window;

means for embedding a first icon that represents a category of links related to the content in a title bar of an application operating in the active window;

means for assigning a relevance rating to each link from a measurable scale of how relevant that link is in relation to the content, wherein a first link from the list of links must have a relevance rating that is equal to or above a minimum threshold relevance rating in relation to the content before alerting the user by highlighting its corresponding icon;

means for highlighting the first icon when one or more of the links related to the content is equal to or above the minimum threshold relevance level in relation to the content in the active window; and a display to display the list of links related to the content when a user activates the first icon, wherein the minimum threshold relevance value is a variable value, selectable by at least a user, on the measurable scale of how relevant that link is in relation to the content.

22. The apparatus of claim 21, further comprising:

means for generating a set of most relevant terms from the text in the content, wherein the set of terms include single terms and noun phrases;

means for executing the query on the set of most relevant terms; and wherein each icon represents a different category of links related to the content.

23. A machine-readable media that store instructions, which when executed by a machine, to cause the machine to perform operations, comprising:

analyzing text from content in an active window without a user requesting the analysis;

executing a query on the content in the active window without a user having to request the query;

generating a ranked list of links related to the content in the active window;

embedding in a title bar of an application operating in the active window a first icon associated with the list of links and a first category of links related to the content;

displaying the generated list of links on a display that is also displaying the active window when the first icon is triggered; and controlling how and where the first icon and the generated list of links is physically presented to the user on the display so as to be visually unobtrusive to the user in relation to the content in the active window by assigning a relevance rating to the links from the list of links from a measurable scale of how relevant a given link is in relation to the content, wherein a given link must have a relevance rating that is equal to or above a minimum threshold relevance value in relation to the content before alerting the user by highlighting its corresponding icon, and embedding two or more icons, including the first icon, in the title bar of the application to be in a visually unobtrusive area of the display relative to the content in the active window, wherein a user interface highlights the first icon if one or more of the links related to the content is equal to or exceeds the minimum threshold relevance rating to the content in the active window in order to unobtrusively visually attract the user's attention to the one or more links, wherein the minimum threshold relevance value is a variable value, selectable by at least a user, on the measurable scale of how relevant that link is in relation to the content.

24. The machine-readable media of claim 23 that store instructions, which when executed by a machine, to cause the machine to perform further operations, comprising:

ranking and categorizing the generated list of links in two or more icons in a visually unobtrusive area of the display relative to the application operating in the active window to allow a user viewing this information to quickly sort through this retrieved information while not preventing the user from working on the content in the active desk top window.

25. The machine-readable media of claim 23 that store instructions, which when executed by a machine, to cause the machine to perform further operations, comprising:
  displaying the list of links related to the content when the user physically activates the first icon;
  displaying the list of links related to the content to the side of the content in the active desktop window to allow the user to view both the content in the active desktop window and the list of links on the display at the same time;
  controlling how and where a summary about a first link related to the content is physically presented to the user on the display so as to be visually unobtrusive to the user in relation to the content in the active window by displaying the summary about the first link related to the content when a user physically moves a cursor over the first link; and
  providing enough information in the summary to allow the user to make an educated decision on the relevance of this information.

* * * * *